Jan. 21, 1958  G. S. RANDLES ET AL  2,820,378
SELF-ALIGNING TOOL HOLDER
Filed June 14, 1954
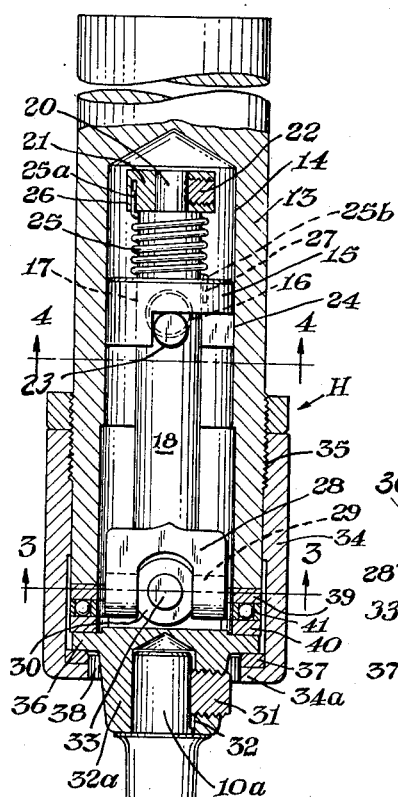
Fig. 1
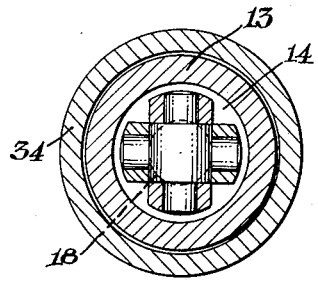
Fig. 3
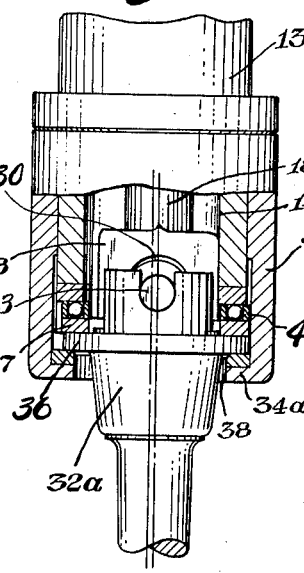
Fig. 2
Fig. 4
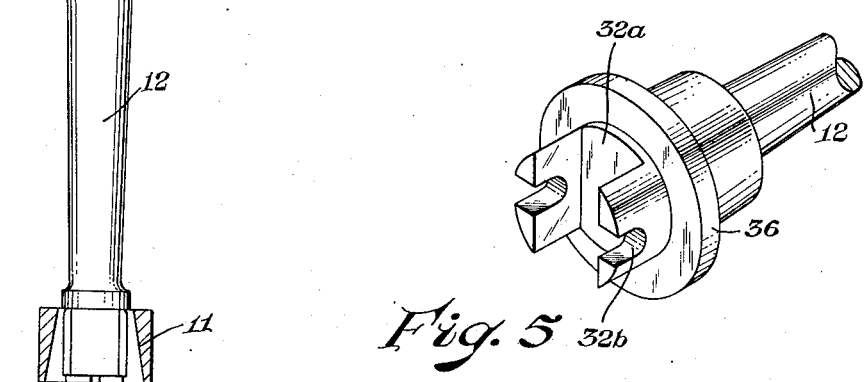
Fig. 5
INVENTORS
Guy S. Randles,
William D. Reynolds,
BY *Fearman & Fearman*
ATTORNEYS

United States Patent Office 2,820,378
Patented Jan. 21, 1958

2,820,378

SELF-ALIGNING TOOL HOLDER

Guy S. Randles and William Denver Reynolds, Alpena, Mich.

Application June 14, 1954, Serial No. 436,476

5 Claims. (Cl. 77—55)

This invention relates to tool holders and more particularly to a self-aligning tool holder for supporting a reamer or the like in a manner to permit an initial limited rotation of the tool with the work to assist the tool in moving into position to commence the cut.

As is well known in the art, in a normal machining operation when a reaming tool or the like is fed toward the bore of a rotating workpiece, the tool and workpiece are rarely in perfect axial alignment. Further, even if the tool and workpiece are perfectly aligned, there is an initial resistance to entrance of the tool into the bore of the rotating workpiece until the cutting edge of one of the teeth has actually moved into the work and the cut has in fact commenced. Thus, with old-type, fixed tool holders and also with the more modern "floating" type holders in which the tool may float into axial alignment with the work, there is considerable chattering when the tool initially engages the work which has resulted in the formation of bell mouth bores. Further, the incidence of tool injury has been high and the average life of a cutting tool holder has been relatively short.

One of the prime objects of the invention is to provide a tool holder which overcomes the disadvantages inherent in holders in present use and moves smoothly into the bore of a workpiece and commences the cut without chattering. Such a tool holder will ream a hole uniformly throughout its entire length and when substituted for conventional holders, will eliminate much tool damage and time lost in replacing damaged tools.

A further object of the invention is to design a self-aligning or self-centering tool holder of improved construction which is initially rotatable as well as shiftable radially in a direction perpendicular to the axis of the holder so that the tool proceeds smoothly and easily to a position of least resistance in which it is in axial alignment with the workpieces and bore to be machined.

Another object of the invention is to provide a tool holder which permits the quantity production high precision machining of workpieces of this nature at relatively low cost.

A further object of the invention is to design a toolholder of reliable and practical construction which is free from operational difficulties and is capable of being utilized in connection with various types of rotary operation.

Another object of the invention is to design a tool holder of rugged and durable construction which will have a long and useful service life.

Still a further object of the invention is to design a tool holder of the type described which is of simple construction and can be very economically manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing:

Fig. 1 is a sectional, elevational view showing the holder and tool feeding down to a workpiece.

Fig. 2 is a similar enlarged, fragmentary view showing the shank on which the tool is mounted universally coupled to an extension stem thereof, the shank being shown out of axial alignment with the holder but parallel thereto.

Fig. 3 is a transverse sectional view taken on the line 3—3 of Fig. 1.

Fig. 4 is a transverse sectional view taken on the line 4—4 of Fig. 1, the broken lines indicating the position of the extension stem pin during the cutting operation.

Fig. 5 is an isometric view of the independent clevis member to which the above mentioned shank is fixed.

Referring now more particularly to the accompanying drawings in which we have illustrated a preferred embodiment of our invention, a letter H generally indicates our novel tool holder which is shown in substantially axial alignment with the bore 10 of a workpiece W.

A reaming tool or cutter 11 is shown mounted on the end of the extending shank 12 of the holder, but clearly where advantageous, other tools of a diverse nature may be employed. Accordingly, while the invention will be described as employed in a reaming operation, it is to be understood that it is not intended that the application of the novel principles disclosed and claimed be in any way restricted thereby.

The holder H includes a tubular body member 13 which is adapted to be non-rotatably mounted on means for feeding the holder axially in the rotating workpiece W. Mounted within the bore 14 of the body member 13 is an annular bearing member 15 which is held stationery within the bore 14 as by an Allen screw 16 extending through the wall of the member 13. The member 15 is bored as at 17 to pass the inner end of an extension stem 18 of the shank 12 and as will later be seen, the stem 18 will have a limited revolution in the opening 17. The inner end of the stem 18 is reduced as at 20 and a collar 21 is fixed against rotation thereon by a setscrew 22. As previously observed, it is desirable that the shank 12 and extension 18 thereof be permitted a limited revolution when the tool 11 initially engages the bore 10 of the rotating workpiece W. To restrict the revolution of the stem 18, a pin 23 is mounted in a transversely disposed opening in the stem 18 and projects into a cut-away stop section 24 between a pair of diametrically opposed, depending, segmental projections 24a and 24b, said pin engaging the stop surfaces 24a thereof when the shank 12 and extension 18 thereof have traveled through approximately one sixth of a revolution.

In Fig. 4, the one end of the pin 23 is shown in inoperative position in engagement with the surfaces 24b of the stops 24. The pin 23 and stem 18 are retained in the position shown until the tool 11 engages the work, by a helical torsion spring 25 which includes an end 25a fixed in an opening 26 in the collar 21, and an end 25b fixed in an opening 27 in the stationary member 15. When the work is initially engaged, the shank 12 and stem 18 will revolve with the work until the opposite ends of the pin 23 come into engagement with the surfaces 24a of the stops 24, all as shown in broken lines in Fig. 4. When the cut has been completed, the spring 25 will, of course, return the shank 12 and stem 18 to original position.

The extension stem 18 and the shank 12 are universally coupled to permit the tool 11 to align itself axially with the bore 10 of the workpiece W, since the holder H and workpiece will rarely be in exact axial alignment. The outer end of the stem 18 is provided with an integral clevis 28 which is pivotally connected to the trunnions 29 of a central coupling block 30. The inner reduced end 10a of the shank 12 is fixed by means of a set screw 31 in an opening 32 in an independent clevis member 32a which is slotted as at 32b to pivotally receive the trunnions 33 on the block 30 which are, of course, disposed at right angles to the trunnions 29.

To prevent movement of the shank 12 except in a radial plane at right angles to the axis of the holder, a sleeve 34 is threaded on the body member 13 of the holder as at 35 and bears against a flange 36 provided on the clevis member 32a to prevent the same from tilting. Actually, a thrust washer 37 is interposed between the flange 36 and end wall 34a of the sleeve 34 which is provided with an opening 38 of sufficient diameter to permit a considerable lateral shifting of the clevis member 32a. Interposed between the end wall of the body member 13 and the flange 36 on the member 32a is a pair of thrust washers 39 and 40 and a sandwiched ball thrust bearing 41, and it will be clear that there is relatively little frictional resistance to lateral or radial movement of the shank 12.

The tool 11 may, of course, be secured on the outer end of the shank 12 in any suitable manner, and it is not deemed necessary to show the means for so securing the tool, inasmuch as it forms no part of the instant invention.

In operation, when the holder H is fed to the revolving workpiece W, the initial engagement of the reaming tool with the workpiece will tend to twist the tool shank 12 in the direction of rotation of the work. Thus, if the workpiece is to revolve in a clockwise direction when looking down upon the same (as in Fig. 1), the spring 25 must be biased to urge the stem 18 and shank 12 in a clockwise direction, and it will be apparent that the spring 25 will be under sufficient tension when the tool is out of contact with the work to retain the pin 23 in engagement with the wall surfaces 24b of the segmental stops 24. It has been determined that by the time the shank 12 and tool have completed approximately one-sixth of a revolution during a normal feed of the tool, the tool will have worked sufficiently into the bore so that the tool is steadied, the blades will have moved into the work and the actual cut can be commenced. Since, while the tool has been free to rotate with the work it has also been free to move laterally, and adopting the course of least resistance to align itself axially with the bore of the workpiece, it will be clear that the tool is moved into the workpiece without the chatter which has characterized operations in which the tools have not been free to work into the workpiece in this manner. When the pin 23 has twisted into engagement with the surfaces 24a of the stops 24, the cut is commenced under full load conditions. Since the tool is in true axial alignment with the bore of the workpiece and in parallel, although not usually in axial alignment with the holder H, the bore will be reamed uniformly throughout its entire length. In Fig. 2, the tool is shown out of axial alignment with the holder to illustrate an adjusted position thereof.

It will thus be apparent that we have perfected a very simple and practical tool holder which will find a wide application in various machining operations. It is within the contemplation of the invention, for example, that the tool holder may be driven and the workpiece held stationary and that the workpiece may be fed to the tool rather than the tool to the workpiece.

It is to be emphasized that various equivalent changes may be made in he various elements which comprise the device and that these various elements may be integrated or separated without departing from the spirit of the invention or the scope of the appended claims, so long as the novel results are attained. In all cases, the drawings and descriptive material are to be interpreted as illustrative rather than limiting and for a determination of the scope of the invention, attention is directed to the appended claims.

What we claim is:

1. In a tool holder for supporting a tool during the machining of a bore of a rotating workpiece, a hollow, substantially cylindrical body member, a bearing fixed within said body member interjacent its ends, an axially disposed stem rotatably mounted in said bearing, and extending therethrough, a laterally disposed stop pin on said stem outward of said bearing but in engagement therewith to prevent axial movement of the stem inwardly, a pair of diametrically opposed segmental stops on said bearing disposed in the angular path of travel of said pin on either side thereof and defining the extent of angular travel of said pin therethrough, a torsion spring on the inner end of said stem connected between the inner end of said stem and said bearing biased to urge said stem in a direction opposite to the rotation of said workpiece into engagement with one of said stops, a tool supporting shank extending outwardly of said body member, means universally connecting said shank to the outer end of said stem for lateral movement of said shank perpendicular to the axis of said stem, and means on said cylindrical body member preventing axial movement of said shank with respect thereto.

2. In a holder adapted to support a tool to be fed into a bore of a workpiece, a tubular body member, a bearing fixed within said body member, a stem member having a substantial revolution in said bearing and extending axially of said body member, cooperating means on the stem and bearing limiting the revolution of said stem therein before it has completed a full revolution, a clevis on the outer end of said stem member, a trunnion block including trunnions received by said clevis and trunnions extending at right angles thereto, a shank having a clevis at one end thereof receiving said latter trunnions and also having a lateral flange in engagement with the end of said body member, and a follower sleeve of greater diameter than said flange threaded on said body member, the sleeve having an end wall holding said flange from movement except in a lateral plane perpendicular to the axis of said stem and body member.

3. In a tool holder comprising, a tubular body member, a bearing fixed within said body member, a stem member having a substantial revolution in said bearing and extending axially of said body member, cooperating means on said stem and bearing limiting the revolution of said stem therein before it has completed a full revolution, a shank mounted partially within an end of said tubular body member, said shank having a lateral-flange in engagement with said end of said body member, and means on said body member engaging said shank, a clevis formed on said stem, and a secondary clevis formed on said shank, and a trunnion block and trunnions disposed between said clevis and said secondary clevis and engaged thereby.

4. A tool holder for supporting a tool during the machining of a bore of a rotating workpiece, a hollow, substantially cylindrical body member, a bearing fixed within said body member, an axially disposed stem rotatably mounted in said bearing and extending therethrough, a laterally disposed stop pin in said stem adjacent said bearing, a pair of diametrically opposed segmental stops projecting from said bearing and positioned in the angular path of travel of said pin on either side thereof and limiting the extent of angular travel of said pin, a torsion spring on said stem on the opposite side of said bearing with respect to said segmental stops and secured to said stem and said bearing to urge said stem in a direction opposite to the rotation of said workpiece, a shank disposed within an end of said body member, and means on said body member caging said shank, means universally connecting and positioned between said shank and stem for lateral movement of said shank perpendicular to the axis of said stem, said shank, universal means and bearing forming means preventing axial movement of said stem and shank relative to said body member.

5. The tool holder for supporting a tool set forth in claim 4 and wherein said tool holder has an annular flange thereabout adjacent the end of said body member and wherein an annular thrust bearing is disposed between said annular flange of said tool holder and said end of said body member.

References Cited in the file of this patent

UNITED STATES PATENTS

| | | |
|---|---|---|
| 952,158 | Wattie | Mar. 15, 1910 |
| 1,244,648 | Sheuman | Oct. 30, 1917 |
| 1,369,491 | Straehle | Feb. 22, 1921 |
| 1,400,368 | Manchester | Dec. 13, 1921 |
| 1,763,717 | Morgan | June 17, 1930 |